US012567532B2

(12) United States Patent
Hamada et al.

(10) Patent No.: US 12,567,532 B2
(45) Date of Patent: Mar. 3, 2026

(54) INDUCTOR

(71) Applicant: Murata Manufacturing Co., Ltd., Kyoto-fu (JP)

(72) Inventors: Shu Hamada, Nagaokakyo (JP); Hiroya Ueyama, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 840 days.

(21) Appl. No.: 17/545,905

(22) Filed: Dec. 8, 2021

(65) Prior Publication Data

US 2022/0102059 A1 Mar. 31, 2022

Related U.S. Application Data

(63) Continuation of application No. PCT/JP2020/023261, filed on Jun. 12, 2020.

(30) Foreign Application Priority Data

Jun. 21, 2019 (JP) ................................ 2019-115432

(51) Int. Cl.
*H01F 27/28* (2006.01)
*H01F 27/02* (2006.01)
(Continued)

(52) U.S. Cl.
CPC ....... *H01F 27/2847* (2013.01); *H01F 27/022* (2013.01); *H01F 27/292* (2013.01); *H01F 2005/006* (2013.01)

(58) Field of Classification Search
CPC .. H01F 27/2847; H01F 27/022; H01F 27/292; H01F 2005/006; H01F 2017/046;
(Continued)

(56) References Cited

U.S. PATENT DOCUMENTS

2004/0090298 A1* 5/2004 Masu ...................... H01F 21/04 336/200
2004/0119574 A1* 6/2004 Lee ..................... H01L 23/5227 336/200

(Continued)

FOREIGN PATENT DOCUMENTS

JP H09-148135 A 6/1997
JP H09-260144 A 10/1997

(Continued)

OTHER PUBLICATIONS

International Search Report issued in PCT/JP2020/023261; mailed Jul. 28, 2020.

(Continued)

*Primary Examiner* — Shawki S Ismail
*Assistant Examiner* — Kazi S Hossain
(74) *Attorney, Agent, or Firm* — Studebaker Brackett PLLC

(57) ABSTRACT

An inductor includes a housing composed of an insulating material and a conical coil provided inside the housing. The conical coil is formed of a spirally wound coil conductor. The winding diameter of the conical coil increases in a continuous manner. The coil conductor has a rectangular cross section. Parts of the coil conductor that are adjacent to each other in a winding axis direction of the conical coil are disposed so as to partially overlap when looking in the winding axis direction of the conical coil. The insulating material of the housing is disposed without any gaps along the periphery of the coil conductor.

19 Claims, 4 Drawing Sheets

(51) Int. Cl.
*H01F 27/29* (2006.01)
*H01F 5/00* (2006.01)

(58) Field of Classification Search
CPC ............. H01F 17/0013; H01F 17/0033; H01F 17/045; H01F 17/04
USPC ................................... 336/192, 198, 200, 83
See application file for complete search history.

(56) References Cited

U.S. PATENT DOCUMENTS

| | | | | |
|---|---|---|---|---|
| 2008/0157913 | A1* | 7/2008 | Kim | H01F 17/0013 336/200 |
| 2012/0188043 | A1* | 7/2012 | Saito | H01F 5/00 336/200 |
| 2017/0169927 | A1* | 6/2017 | Miyamoto | H01F 27/32 |

FOREIGN PATENT DOCUMENTS

| | | | |
|---|---|---|---|
| JP | 2009088212 | A * | 4/2009 |
| JP | 2018-182050 | A | 11/2018 |
| JP | 2018-190814 | A | 11/2018 |

OTHER PUBLICATIONS

Written Opinion of the International Searching Authority issued in PCT/JP2020/023261; mailed Jul. 28, 2020.

* cited by examiner

INDUCTOR

CROSS-REFERENCE TO RELATED APPLICATIONS

This application claims benefit of priority to International Patent Application No. PCT/JP2020/023261, filed Jun. 12, 2020, and to Japanese Patent Application No. 2019-115432, filed Jun. 21, 2019, the entire contents of each are incorporated herein by reference.

BACKGROUND

Technical Field

The present disclosure relates to an inductor that includes conical coil.

Background Art

A variety of inductors that include coil-shaped conductors are known, as described, for example, in Japanese Unexamined Patent Application Publication No. 2018-190814 and Japanese Unexamined Patent Application Publication No. 9-148135). Japanese Unexamined Patent Application Publication No. 2018-190814 discloses an inductor in which a conical coil is formed by accommodating a winding inside an insulating housing. Japanese Unexamined Patent Application Publication No. 9-148135 discloses an inductor in which a conical coil is formed by forming tapered holes in green sheets and then forming coil-shaped conductors along the inner walls of the holes.

SUMMARY

In the inductor disclosed in Japanese Unexamined Patent Application Publication No. 2018-190814, the winding has a circular cross-sectional shape and the volume efficiency in the height direction of the package (conductor packing density) is low. In addition, the winding is accommodated in spiral-shaped holes formed in the housing. In this case, it is necessary to provide a sufficient thickness of insulator between two holes that are adjacent to each other in the axial direction of the coil in order to form the insulator housing. This tends to increase the size of the inductor.

In addition, in the inductor disclosed in Japanese Unexamined Patent Application Publication No. 9-148135, coil-shaped conductors are formed along tapered holes. Therefore, since the coil-shaped conductors cannot be stacked in the winding axis direction, the dimension in a diameter direction perpendicular to the winding axis direction is increased. In addition, since stepped holes are formed and inner conductors are added to the sidewall surfaces of the holes, it is difficult to reduce the size of the winding diameter.

Accordingly, the present disclosure provides an inductor having high volume efficiency and that can be reduced in size.

An inductor of an embodiment of the present disclosure includes a housing composed of an insulating material and a conical coil provided inside the housing. The conical coil is formed of a spirally wound coil conductor. A winding diameter of the conical coil increases in a continuous manner. The coil conductor has a rectangular cross section. Parts of the coil conductor that are adjacent to each other in a winding axis direction of the conical coil are disposed so as to partially overlap when looking in the winding axis direction of the conical coil. The insulating material of the housing is disposed without any gaps along a periphery of the coil conductor.

According to the embodiment of the present disclosure, volume efficiency can be improved and the inductor can be reduced in size.

DETAILED DESCRIPTION

Hereafter, inductors according to embodiments of the present disclosure will be described in detail while referring to the accompanying drawings.

FIGS. 1 to 4 illustrate an inductor 1 according to a First Embodiment of the present disclosure. The inductor 1 includes a housing 2 and a conical coil 3.

The housing 2 is formed of an insulating material i such as a ceramic material. The insulating material i of the housing 2 may be a magnetic material or may be a non-magnetic material. The housing 2 is formed in a rectangular parallelepiped shape, for example. The housing 2 has a first main surface 2A and a second main surface 2B, which face each other. The housing 2 is not limited to having a rectangular parallelepiped shape, and may instead have a cylindrical shape, for example.

Figure 1:
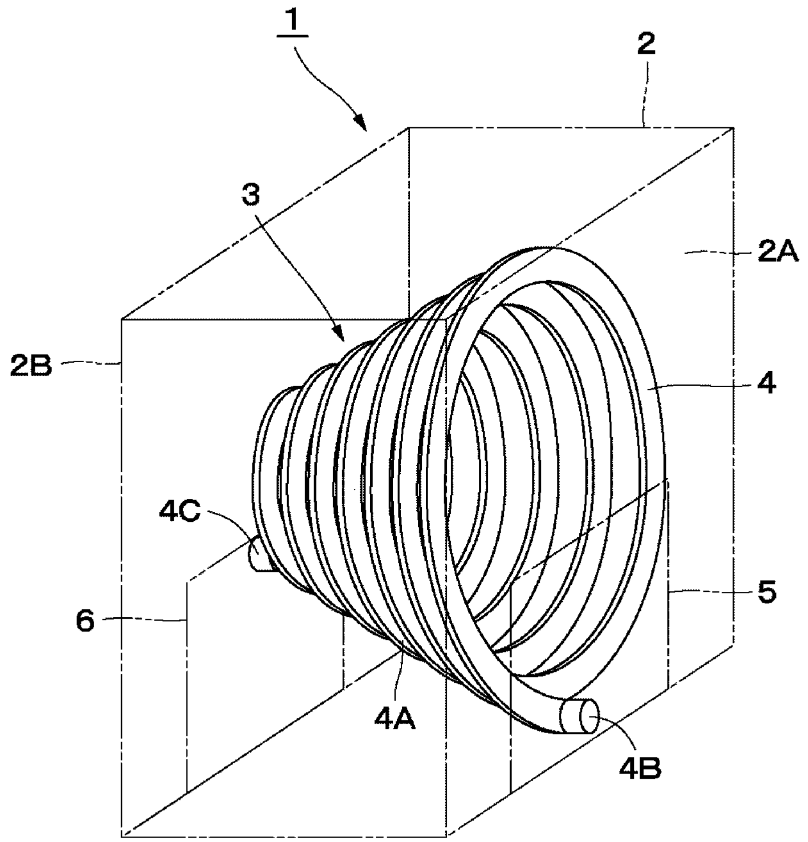
FIG. 1 is a perspective view illustrating an inductor according to a First Embodiment of the present disclosure.
Figure 2:
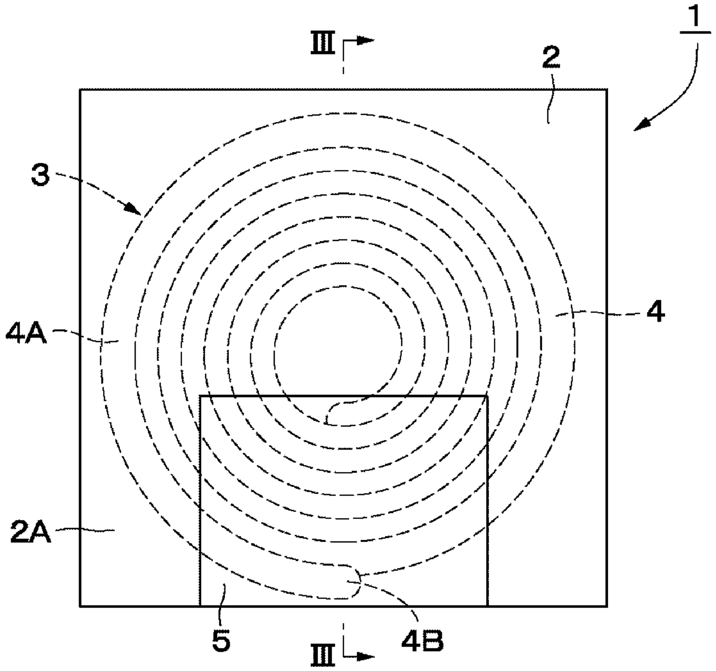
FIG. 2 is a front view illustrating the inductor in FIG. 1.
Figure 3:
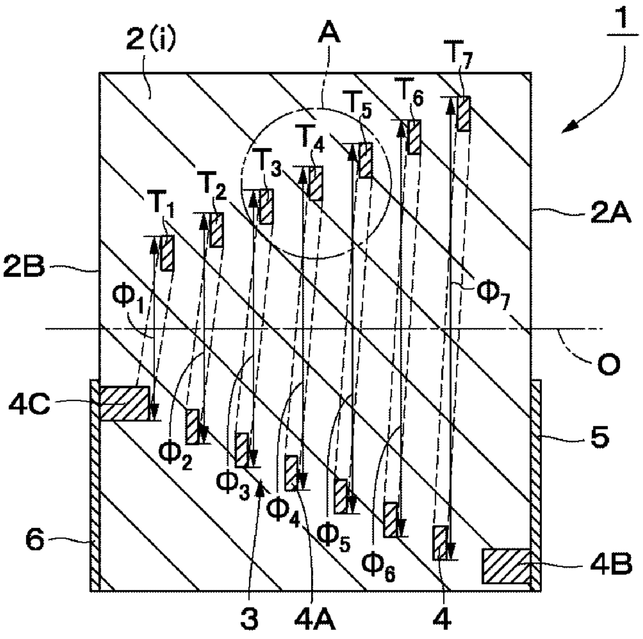
FIG. 3 is a sectional view in which the inductor is viewed in the direction of arrows III-III in FIG. 2.

The conical coil 3 is provided inside the housing 2. As illustrated in FIG. 3, the conical coil 3 is formed of a coil conductor 4, which is spirally wound around a winding axis O. The coil conductor 4 is, for example, formed of an electrically conductive metal material serving as a conductive material. The coil conductor 4 is formed in a long thin strip shape. The coil conductor 4 is wound in a spiral shape with the winding axis direction thereof being a direction perpendicular to the first main surface 2A and the second main surface 2B of the housing 2. The coil conductor 4 includes a coil part 4A wound in a conical shape, an electrode connection part 4B connected to a first end portion of the coil part 4A, and an electrode connection part 4C connected to a second end portion of the coil part 4A. The coil part 4A of the coil conductor 4 is wound through a plurality of turns (for example, seven turns) in the winding axis direction. The coil part 4A is continuously connected from a first turn $T_1$ to a seventh turn $T_7$. The first end portion of the coil conductor 4 is located on the outside in the diameter direction of the conical coil 3 and forms an outer radial end portion of the conical coil 3. The first end portion of the coil conductor 4 is disposed at a position near the first main surface 2A of the housing 2 and forms the electrode connection part 4B. The second end portion of the coil conductor 4 is located on the inside in the diameter direction of the conical coil 3 and forms an inner radial end portion of the conical coil 3. The second end portion of the coil conductor 4 is disposed at a position near the second main surface 2B of the housing 2 and forms the electrode connection part 4C.

Figure 4:
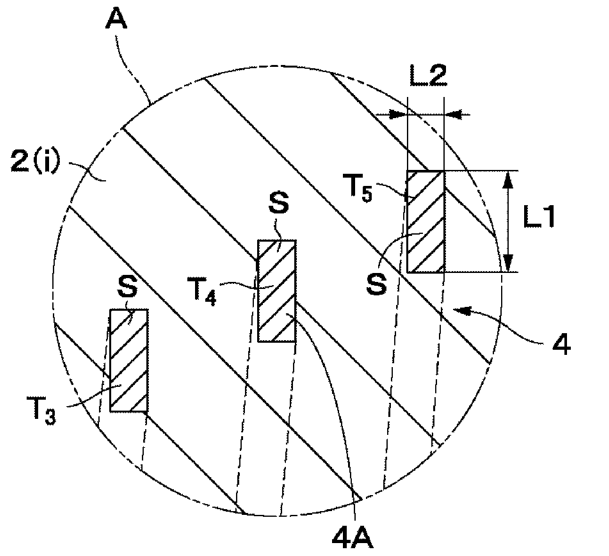
FIG. 4 is an enlarged sectional view illustrating a part A in FIG. 3 in an enlarged manner.

As illustrated in FIGS. 3 and 4, a cross section S of the coil conductor 4 has a rectangular shape. The cross section S of the coil conductor 4 is formed in a shape such that a dimension L1 in the diameter direction of the conical coil 3 is larger than a dimension L2 in the axial direction of the conical coil 3. Therefore, the aspect ratio of the cross section S of the coil conductor 4 is set to a value larger than 1 (for example, around 10).

The winding diameter of the conical coil 3 increases continuously as the conical coil 3 approaches the first main surface 2A from the second main surface 2B. For example, a winding diameter $\Phi_2$ of a second turn $T_2$ is larger than a winding diameter $\Phi_1$ of a first turn $T_1$ of the coil conductor 4. This similarly holds true for the second and subsequent turns ($\Phi_1<\Phi_2< \ldots <\Phi_7$). The coil conductor 4 is disposed in so as to overlap itself when viewed in the winding axis direction of the conical coil 3. In plan view in the winding axis direction, for example, the first turn $T_1$ and the second turn $T_2$ of the coil conductor 4 partially overlap each other. This is also true for the second and subsequent turns. In other words, parts of the coil conductor 4 that are adjacent to each other in the winding axis direction partially overlap each other. The insulating material i of the housing 2 is disposed without any gaps around the periphery of the coil conductor 4.

A first outer electrode 5 is provided on the housing 2 and connected to the first end portion (electrode connection part 4B) of the coil conductor 4. The first outer electrode 5 is, for example, formed of an electrically conductive metal material, serving as a conductive material. The first outer electrode 5 is disposed on the first main surface 2A of the housing 2.

A second outer electrode 6 is provided on the housing 2 and connected to the second end portion (electrode connection part 4C) of the coil conductor 4. The second outer electrode 6 is, for example, formed of an electrically conductive metal material, serving as a conductive material. The second outer electrode 6 is disposed on the second main surface 2B of the housing 2. The first outer electrode 5 and the second outer electrode 6 are disposed so as to be separated from each other.

The inductor 1 according to the First Embodiment of the present disclosure has the above-described configuration. The inductor 1 is manufactured using a manufacturing method including the following three steps.

In a first step, an insulator ink consisting of ceramic particles, an organic binder, and a solvent and a conductor ink consisting of metal particles, an organic binder, and a solvent are ejected using an inkjet method, and volatilization and drying of the solvent in each ink are repeatedly performed. At this time, for example, layers composed of ceramic particles and metal particles are stacked one layer at time in the winding axis direction. In this way, molded bodies consisting of ceramic particles, metal particles, and organic components are formed. The molded bodies do not have to be stacked in the winding axis direction of the conical coil 3 and may instead be stacked in the diameter direction of the conical coil 3.

In a second step (degreasing step), the organic components of the molded bodies formed in the first step are removed. In a third step (firing step), the molded bodies from which the organic components were removed in the second step are heated and the insulators and conductors are simultaneously sintered. Thus, the housing 2 having the built-in conical coil 3 is formed.

After that, the first outer electrode 5 and the second outer electrode 6 are attached to the housing 2. Thus, the inductor 1 is completed. At this time, the first outer electrode 5 is located on the first main surface 2A of the housing 2 and is electrically connected to the first end portion (electrode connection part 4B) of the conical coil 3. The second outer electrode 6 is located on the second main surface 2B of the housing 2 and is electrically connected to the second end portion (electrode connection part 4C) of the conical coil 3.

Thus, in the inductor 1 according to this embodiment, the coil conductor 4 has a rectangular cross section S. Therefore, a spacing dimension between parts of the coil conductor 4 that are adjacent to each other in the winding axis direction can be made smaller. Thus, the thickness of the insulating material i between parts of the coil conductor 4 that are adjacent to each other in the winding axis direction can be made smaller and the coil conductor 4 can be tightly disposed inside the housing 2 with respect to the winding axis direction. As a result, the ratio of the coil conductor 4 to the housing 2 can be increased, and therefore the volume efficiency (conductor packing density) of the inductor 1 is increased, and the inductor 1 can be reduced in size.

Furthermore, parts of the coil conductor 4 that are adjacent to each other in the winding axis direction are disposed so as to partially overlap when looking in the winding axis direction of the conical coil 3. Therefore, compared to a case in which the coil conductor does not overlap itself, the outer diameter dimension of the housing 2 in the winding diameter direction of the conical coil 3 can be made smaller and the inductor 1 can be reduced in size. In addition, since the winding diameter dimension of the conical coil 3 can be made smaller, the inductance value in the small diameter part of the conical coil 3 (part close to electrode connection part 4C) can be reduced.

In addition, the cross section S of the coil conductor 4 is formed in a shape such that the dimension L1 thereof in the winding diameter direction of the conical coil 3 is larger than the dimension L2 thereof in the winding axis direction of the conical coil 3. In other words, the cross section S of the coil conductor 4 has a rectangular aspect ratio that is greater than 1. Therefore, internal stress can be reduced by reducing the thickness of the coil conductor 4 (dimension L2 in winding axis direction). Therefore, warping and cracking of the housing 2 during firing can be suppressed even when the housing 2 is formed by firing molded bodies, for example.

Figure 5:
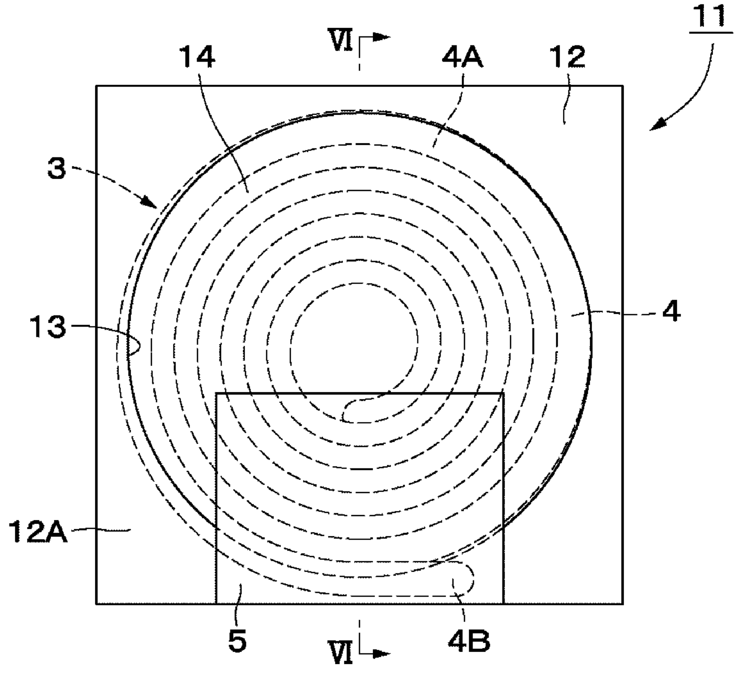
FIG. 5 is a front view illustrating an inductor according to a Second Embodiment of the present disclosure.
Figure 6:
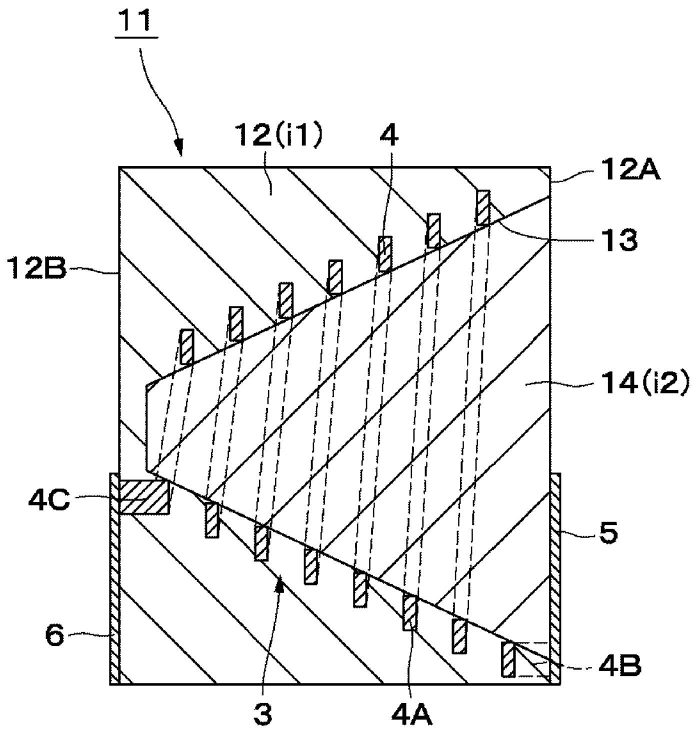
FIG. 6 is a sectional view in which the inductor is viewed in the direction of arrows VI-VI in FIG. 5.

Next, a Second Embodiment of the present disclosure will be described using FIGS. 5 and 6. A feature of the Second Embodiment is that a core composed of a magnetic material having a higher magnetic permeability than the insulating material of the housing is disposed on the inside in the winding diameter direction of the conical coil and the core and the coil conductor at least partially contact each other. In the Second Embodiment, constituent elements that are the same as in the First Embodiment are denoted by the same symbols and description thereof is omitted.

Similarly to the First Embodiment, an inductor 11 according to the Second Embodiment includes a housing 12 and the conical coil 3.

The housing 12 is formed of an insulating material i1 such as a ceramic material. The insulating material i1 of the housing 12 may be a magnetic material or may be a non-magnetic material. The housing 12 is formed in a rectangular parallelepiped shape, for example. The housing 12 has a first main surface 12A and a second main surface 12B, which face each other.

However, a cone-shaped recess 13 is formed in the housing 12 so as to be located on the inside in the winding diameter direction of the conical coil 3. The housing 12 according to the Second Embodiment differs from the housing 2 according to the First Embodiment in this respect. The diameter direction dimension of the recess 13 is larger on the side near the first main surface 12A and becomes smaller with increasing proximity to the second main surface 12B in accordance with the shape of the conical coil 3. The recess 13 is open at the first main surface 12A. The coil conductor 4 of the conical coil 3 is exposed at the side wall surface of the recess 13.

The recess 13 in the housing 12 is filled with a core 14. The core 14 is composed of an insulating material i2 and is formed in a conical shape corresponding to the recess 13. The core 14 is formed of a magnetic material having a higher magnetic permeability than the insulating material i1 of the housing 12. The core 14 and the coil conductor 4 at least partially contact each other. Specifically, an outer peripheral surface of the core 14 contacts an inner peripheral part of the coil conductor 4. The core 14 may be fired together with the housing 12 or the core 14 may be inserted after firing the housing 12.

Therefore, with the thus-configured inductor 11 of the Second Embodiment as well, the volume efficiency can be increased and the inductor 11 can be reduced in size. For example, the inductor disclosed in Japanese Unexamined Patent Application Publication No. 2018-190814 has a gap formed around the periphery of the winding and therefore the diameter direction dimension of the winding tends to be larger due to this gap. Furthermore, in an inductor of a type in which a copper wire is wound around a core, the diameter direction dimension tends to be larger in order to ensure the strength of the core. In contrast, in the Second Embodiment, the core 14 and the coil conductor 4 contact each other. In addition, the core 14 may be formed together with the housing 12 or may be inserted into the recess 13 of the housing 12 after forming the housing 12. Therefore, there is no need to increase the rigidity of the core 14 and the diameter direction dimension of the conical coil 3 can be reduced. In addition, manufacturing is easier and the positional accuracy of the coil conductor 4 with respect to the magnetic material can be improved compared with an inductor of a type in which a copper wire is wound around a core.

In each of the above embodiments, the cross section S of the coil conductor 4 is formed in a shape such that the dimension L1 thereof in the winding diameter direction of the conical coil 3 is larger than the dimension L2 thereof in the winding axis direction of the conical coil 3. The present disclosure is not limited to this configuration, and the cross section S of the coil conductor 4 may be formed in a shape such that the dimension L1 thereof in the winding diameter direction of the conical coil 3 is the same as the dimension L2 thereof in the winding axis direction of the conical coil 3.

In each of the above embodiments, the coil conductor 4 was described using an example in which the number of turns of the coil conductor 4 is seven. The present disclosure is not limited to this configuration and the number of turns of the coil conductor 4 may be from 2 to 6 or may be 8 or more.

Next, the inductors included in the above embodiments may include inductors according to the following aspects, for example.

An inductor of a First Aspect includes a housing composed of an insulating material and a conical coil provided inside the housing. The conical coil is formed of a spirally wound coil conductor. A winding diameter of the conical coil increases in a continuous manner. The coil conductor has a rectangular cross section. Parts of the coil conductor that are adjacent to each other in a winding axis direction of the conical coil are disposed so as to partially overlap when viewed in the winding axis direction of the conical coil. The insulating material of the housing is disposed without any gaps along a periphery of the coil conductor.

At this time, the coil conductor has a rectangular cross section. Therefore, a spacing dimension between parts of the coil conductor that are adjacent to each other in the winding axis direction can be made smaller. Thus, the thickness of the insulating material between parts of the coil conductor that are adjacent to each other in the winding axis direction can be made smaller and the coil conductor can be tightly disposed inside the housing with respect to the winding axis direction. As a result, the ratio of the coil conductor to the housing can be increased, and therefore the volume efficiency (conductor packing density) of the inductor is increased, and the inductor can be reduced in size.

In addition, the coil conductor is disposed in such a manner as to overlap itself when viewed in the winding axis direction of the conical coil. Therefore, an outer diameter dimension of the housing in the winding diameter direction of the conical coil can be made smaller and the inductor can be reduced in size. In addition, since the winding diameter dimension of the conical coil can be made smaller, the inductance value at the small diameter part of the conical coil can be reduced.

In a Second Aspect based on the First Aspect, the cross section of the coil conductor is formed in a shape such that a dimension thereof in a winding diameter direction of the conical coil is larger than a dimension thereof in the winding axis direction of the conical coil.

Therefore, internal stress can be reduced due to the thickness of the coil conductor being reduced. Therefore, warping and cracking of the housing during firing can be suppressed even when the housing is formed by firing molded bodies, for example.

In a Third Aspect based on the First or Second Aspect, a core composed of a magnetic material having a higher magnetic permeability than the insulating material of the housing is disposed on an inner side in the winding diameter direction of the conical coil and the core and the coil conductor at least partially contact each other.

This enables the dimension of the conical coil in the diameter direction to be reduced. In addition, manufacturing is easier and the positional accuracy of the coil conductor with respect to the magnetic material can be improved compared with an inductor of a type in which a copper wire is wound around a core.

What is claimed is:

1. An inductor comprising:

a housing composed of an insulating material; and a conical coil provided inside the housing, wherein the conical coil is configured of a spirally wound coil conductor, a winding diameter of the conical coil increases in a continuous manner, the coil conductor has a rectangular cross section, an upper surface, a lower surface, and a peripheral surface extending from the upper surface to the lower surface, parts of the coil conductor that are adjacent to each other in a winding axis direction of the conical coil are disposed such that the upper surface of a first turn faces the lower surface of an adjacent second turn, so as to overlap where the upper surface of the first turn faces the lower surface of the adjacent second turn when looking in the winding axis direction of the conical coil, the insulating material of the housing is disposed without any gaps along a periphery of the coil conductor, and the rectangular cross section of the coil conductor is configured in a shape such that a dimension thereof in a winding diameter direction of the conical coil is larger than a dimension thereof in the winding axis direction of the conical coil.

2. The inductor according to claim 1, wherein a core composed of a magnetic material having a higher magnetic permeability than the insulating material of the housing is disposed on an inner side in the winding diameter direction of the conical coil; and the core and the coil conductor at least partially contact each other.

3. The inductor according to claim 1, further comprising:

a first electrode on one surface of the housing and connected to a first end of the conical coil, and a second electrode on another surface of the housing and connected to a second end of the conical coil opposite to the first end.

4. The inductor according to claim 3, further comprising:

a first electrode connection part that connects the first electrode to the first end of the conical coil, and a second electrode connection part that connects the second electrode to the second end of the conical coil.

5. The inductor according to claim 1, wherein the first turn of the coil conductor has a first radius extending to an outermost edge of the upper surface, the adjacent second turn of the coil conductor has a second radius extending to an innermost edge of the lower surface, and the second radius is smaller than the first radius so that the first turn and the adjacent second turn overlap in an area between the first radius and the second radius when looking in the winding axis direction of the conical coil.

6. An inductor comprising:

a housing composed of an insulating material; and a conical coil provided inside the housing, wherein the conical coil is configured of a spirally wound coil conductor, a winding diameter of the conical coil increases in a continuous manner, the coil conductor has a rectangular cross section, an upper surface, and a lower surface, parts of the coil conductor that are adjacent to each other in a winding axis direction of the conical coil are disposed such that a first turn of the coil conductor has a first radius extending to an outermost edge of the upper surface and an adjacent second turn of the coil conductor has a second radius extending to an innermost edge of the lower surface, and the second radius is smaller than the first radius so that the first turn and the adjacent second turn overlap in an area between the first radius and the second radius when looking in the winding axis direction of the conical coil, the insulating material of the housing is disposed without any gaps along a periphery of the coil conductor, and the rectangular cross section of the coil conductor is configured in a shape such that a dimension thereof in a winding diameter direction of the conical coil is larger than a dimension thereof in the winding axis direction of the conical coil.

7. The inductor according to claim 6, wherein a core composed of a magnetic material having a higher magnetic permeability than the insulating material of the housing is disposed on an inner side in the winding diameter direction of the conical coil; and the core and the coil conductor at least partially contact each other.

8. The inductor according to claim 6, further comprising:

a first electrode on one surface of the housing and connected to a first end of the conical coil, and a second electrode on another surface of the housing and connected to a second end of the conical coil opposite to the first end.

9. The inductor according to claim 8, further comprising:

a first electrode connection part that connects the first electrode to the first end of the conical coil, and a second electrode connection part that connects the second electrode to the second end of the conical coil.

10. An inductor comprising:

a housing composed of an insulating material; and a conical coil provided inside the housing, wherein the conical coil is configured of a spirally wound coil conductor, a winding diameter of the conical coil increases in a continuous manner, the coil conductor has a rectangular cross section, an upper surface, a lower surface, and a peripheral surface extending from the upper surface to the lower surface, the rectangular cross section having an upper side and a lower side extending along a winding diameter direction of the conical coil, parts of the coil conductor that are adjacent to each other in a winding axis direction of the conical coil are disposed such that the upper surface of a first turn faces the lower surface of an adjacent second turn, so as to overlap where the upper surface of the first turn faces the lower surface of the adjacent second turn when looking in the winding axis direction of the conical coil, and the insulating material of the housing is disposed without any gaps along a periphery of the coil conductor.

11. The inductor according to claim 10, wherein the rectangular cross section of the coil conductor is configured in a shape such that a dimension thereof in the winding diameter direction of the conical coil is larger than a dimension thereof in the winding axis direction of the conical coil.

12. The inductor according to claim 10, wherein a core composed of a magnetic material having a higher magnetic permeability than the insulating material of the housing is disposed on an inner side in the winding diameter direction of the conical coil; and the core and the coil conductor at least partially contact each other.

13. The inductor according to claim 10, further comprising:

a first electrode on one surface of the housing and connected to a first end of the conical coil, and a second electrode on another surface of the housing and connected to a second end of the conical coil opposite to the first end.

14. The inductor according to claim 1, wherein a portion of an upper face of a first turn facing an adjacent turn faces a lower face of the adjacent turn in a direction that is perpendicular to the upper face and parallel to the winding axis direction.

15. The inductor according to claim 6, wherein a portion of an upper face of a first turn facing an adjacent turn faces a lower face of the adjacent turn in a direction that is perpendicular to the upper face and parallel to the winding axis direction.

16. The inductor according to claim 10, wherein a portion of an upper face of a first turn facing an adjacent turn faces a lower face of the adjacent turn in a direction that is perpendicular to the upper face and parallel to the winding axis direction.

17. The inductor according to claim 1, wherein, in a cross section of the inductor extending through and parallel to the winding axis, the inductor includes a first side and a second side that are divided by the winding axis, the cross section extends through the first turn on the first side and through the first turn on the second side, an imaginary line extends perpendicular to the winding axis, past the first turn of the coil conductor on the first side, past the first turn of the coil conductor on the second side, and the imaginary line is positioned between the first turn on the first side and the first turn on the second side in the winding axis direction, and does not contact the coil conductor of the first turn.

18. The inductor according to claim 6, wherein, in a cross section of the inductor extending through and parallel to the winding axis, the inductor includes a first side and a second side that are divided by the winding axis, the cross section extends through the first turn on the first side and through the first turn on the second side, an imaginary line extends perpendicular to the winding axis, past the first turn of the coil conductor on the first side, past the first turn of the coil conductor on the second side, and the imaginary line is positioned between the first turn on the first side and the first turn on the second side in the winding axis direction, and does not contact the coil conductor of the first turn.

19. The inductor according to claim 10, wherein, in a cross section of the inductor extending through and parallel to the winding axis, the inductor includes a first side and a second side that are divided by the winding axis, the cross section extends through the first turn on the first side and through the first turn on the second side, an imaginary line extends perpendicular to the winding axis, past the first turn of the coil conductor on the first side, past the first turn of the coil conductor on the second side, and the imaginary line is positioned between the first turn on the first side and the first turn on the second side in the winding axis direction, and does not contact the coil conductor of the first turn.

* * * * *